US008980778B2

(12) United States Patent
Sturgis et al.

(10) Patent No.: US 8,980,778 B2
(45) Date of Patent: Mar. 17, 2015

(54) MOLD SYSTEM FOR CASTING OF REACTIVE ALLOYS

(75) Inventors: David H. Sturgis, Hillsboro, OR (US); Thomas M. Branscomb, Portland, OR (US)

(73) Assignee: Buntrock Industries, Inc., Williamsburg, VA (US)

( * ) Notice: Subject to any disclaimer, the term of this patent is extended or adjusted under 35 U.S.C. 154(b) by 9 days.

(21) Appl. No.: 11/938,374

(22) Filed: Nov. 12, 2007

(65) Prior Publication Data

US 2008/0119347 A1 May 22, 2008

Related U.S. Application Data

(60) Provisional application No. 60/865,226, filed on Nov. 10, 2006.

(51) Int. Cl.
| | |
|---|---|
| C03C 3/062 | (2006.01) |
| C03C 3/04 | (2006.01) |
| C04B 35/634 | (2006.01) |
| C04B 35/111 | (2006.01) |
| C04B 35/486 | (2006.01) |
| C04B 35/50 | (2006.01) |
| C04B 35/505 | (2006.01) |
| C04B 35/626 | (2006.01) |
| C04B 35/63 | (2006.01) |
| C04B 35/632 | (2006.01) |

(52) U.S. Cl.
CPC ......... *C04B 35/63416* (2013.01); *C04B 35/111* (2013.01); *C04B 35/486* (2013.01); *C04B 35/50* (2013.01); *C04B 35/505* (2013.01); *C04B 35/6263* (2013.01); *C04B 35/62665* (2013.01); *C04B 35/6316* (2013.01); *C04B 35/632* (2013.01); *C04B 2235/3208* (2013.01); *C04B 2235/3217* (2013.01); *C04B 2235/3224* (2013.01); *C04B 2235/3227* (2013.01); *C04B 2235/3244* (2013.01); *C04B 2235/3246* (2013.01); *C04B 2235/3248* (2013.01); *C04B 2235/3418* (2013.01); *C04B 2235/5436* (2013.01)
USPC .............................. 501/73; 501/53

(58) Field of Classification Search
USPC ............................. 106/38.2, 38.22
See application file for complete search history.

(56) References Cited

U.S. PATENT DOCUMENTS

| | | | |
|---|---|---|---|
| 3,005,244 A | 10/1961 | Reiner et al. | |
| 3,640,735 A * | 2/1972 | Oppenheimer et al. | ... 138/118.1 |
| 3,894,572 A * | 7/1975 | Moore, Jr. | ...... 164/516 |
| 3,898,090 A | 8/1975 | Clark | |
| 4,196,769 A | 4/1980 | Feagin | |
| 4,316,744 A | 2/1982 | Bergna | |
| 4,703,806 A | 11/1987 | Lassow et al. | |
| 4,787,439 A | 11/1988 | Feagin | |
| 4,799,530 A | 1/1989 | Sturgis et al. | |
| 4,815,516 A | 3/1989 | Sturgis et al. | |
| 4,947,927 A | 8/1990 | Horton | |
| 4,966,225 A | 10/1990 | Johnson et al. | |
| 1,996,175 A | 2/1991 | Sturgis | |
| 4,996,175 A * | 2/1991 | Sturgis | ........... 501/126 |
| 5,118,727 A * | 6/1992 | Roberts et al. | ........... 523/216 |
| 5,219,821 A * | 6/1993 | Arbee et al. | ........... 503/226 |
| 5,407,001 A | 4/1995 | Yasrebi et al. | |
| 5,464,797 A * | 11/1995 | Yasrebi et al. | ........... 501/103 |
| 5,535,810 A | 7/1996 | Compton et al. | |
| 5,577,547 A | 11/1996 | Hosamani | |
| 5,618,633 A | 4/1997 | Swanson et al. | |
| 5,624,604 A | 4/1997 | Yasrebi et al. | |
| 5,630,465 A | 5/1997 | Feagin | |
| 5,643,844 A | 7/1997 | Yasrebi et al. | |
| 5,712,435 A | 1/1998 | Feagin | |
| 5,927,379 A | 7/1999 | Yasrebi et al. | |
| 5,944,088 A | 8/1999 | Feagin | |
| 6,024,163 A | 2/2000 | Springgate et al. | |
| 6,102,099 A | 8/2000 | Sturgis et al. | |
| 6,326,429 B1 | 12/2001 | Sturgis et al. | |
| 6,390,179 B1 | 5/2002 | Yasrebi et al. | |
| 6,619,368 B1 | 9/2003 | Springgate et al. | |
| 6,920,913 B2 | 7/2005 | Yasrebi et al. | |
| 2002/0109249 A1* | 8/2002 | Klug et al. | ........... 264/28 |
| 2003/0071884 A1* | 4/2003 | Iwasa et al. | ........... 347/105 |
| 2005/0092459 A1 | 5/2005 | McGuire | |

FOREIGN PATENT DOCUMENTS

| | | |
|---|---|---|
| DE | 20217780 U1 | 4/2003 |
| GB | 861378 A | 2/1961 |
| GB | 1349527 A | 4/1974 |

* cited by examiner

*Primary Examiner* — Yun Qian
(74) *Attorney, Agent, or Firm* — Harness, Dickey & Pierce, PLC

(57) ABSTRACT

The present invention relates to novel binder and slurry formulations used to form molds for casting metal alloys and, more particularly, reactive metal alloys. The shell molds lead to more uniform castings which exhibit limited alpha case as compared to other currently available shell mold systems.

18 Claims, No Drawings

MOLD SYSTEM FOR CASTING OF REACTIVE ALLOYS

CROSS-REFERENCE TO RELATED APPLICATIONS

This application claims the benefit of U.S. Provisional Application No. 60/865,226, filed on Nov. 10, 2006. The disclosure of the above application is incorporated herein by reference.

TECHNICAL FIELD

The present disclosure relates to slurry compositions and molds made therefrom for casting metal alloys, particularly reactive metal alloys.

BACKGROUND OF THE INVENTION

It is known that suitable refractory systems for the investment casting of reactive alloys such as titanium, zirconium, etc., are very difficult to achieve due to the extremely reactive nature of such alloys. These alloys will reduce most oxides on contact during the casting process yielding extensive gas defects and causing solubility of oxygen in the surface layers of the casting thus requiring extensive chemical machining to remove this layer as it is brittle and renders the castings unsuitable for use in most applications. This is a very serious problem in castings being used in aerospace applications for example. Current yttria systems have been developed and are being used commercially, but these systems depend on short-lived prime coat slurries, which must be carefully controlled and can only be maintained for one week or less. Thereafter, such slurries tend to severely degrade.

In the yttria prime slurries currently used in the marketplace, the approach to overcoming the tendency for ions liberated by the relatively rapid dissolution of yttria in lower pH condition is one of two general methods. In one, additions of a large organic bases such as tetraethylammonium hydroxide for example to a yttria slurry helps prevent the dissolution of silica at the high pH levels necessary to keep the slurry stable. Other approaches have been to "alloy" the yttria with other non-reactive oxides in a fusion process which tends to reduce the number of dissolution sites on the yttria particles or to coat the yttria with large adsorbed organic molecules to achieve the same result, both methods contributing to the overall stability of the system. While these methods work to some degree, there is still a need for reactive alloy mold systems that require limited amounts, if any, of such additives and can utilize commercially available refractory materials such as pure fused yttria or sintered yttria material to produce a stable slurry with a relatively long shelf life. In the present disclosure, such a system is presented.

SUMMARY OF THE INVENTION

The slurries of the present invention and, ultimately, the investment casting molds made therefrom comprise refractory material; low silica content colloidal sol binder including an organic polymer; and, optionally, one or more of the following: cross-linking agent, sintering agent, surfactant, anti-foaming agent, and, stabilizing acid. As will be discussed in greater detail below, the low silica content colloidal sol may be positively charged, negatively charged or neutral depending upon the application.

By employing the novel slurries of the present invention to form molds or "shells" as they are otherwise known in the art to cast reactive metal components, components having improved casting quality, and which exhibit low alpha case, can be readily formed.

DETAILED DESCRIPTION OF THE INVENTION

While the slurry compositions described herein are generally used as prime coat slurries as the term is understood in the art, the compositions described herein may also be useful as intermediate slurries under certain circumstances with minor modifications as will be explained below.

In the preparation of a casting shell used to mold a metal object, at least one application of the prime slurry is coated onto a wax pattern, the excess slurry is drained from the pattern and then the part is typically stuccoed with any suitable refractory grain, including, but not limited to fused yttria, fused alumina and fused zirconia. Thereafter, additional layers of prime coats and/or backup coats, with or without stuccoing, as is known in the art, are applied to the green shell formed from the prime slurry until the shell has the desired thickness.

As noted above, the slurries of the present invention include refractory materials which are suitable for forming shell molds used to cast aerospace, medical, marine and sporting good products for example, out of reactive metals such as titanium and zirconium, as well as products formed from less reactive alloys such as Inconel® 718, 738 and 792; Rene 80 and Mar M 302, by way of non-limiting example. As such, the refractory material preferably is one that not only leads to strong shell molds but also one that is capable of limiting oxide reduction upon contact with the molten metals being cast. The examples of useful refractory materials include yttria, zirconia and rare earth metal oxides. Preferred refractory materials include fused yttria, sintered yttria, fused zirconia, fused calcium zirconate, $Er_2O_3$, $Sc_2O_3$, $Pr_2O_3$, SrO, $La_2O_3$ and mixtures thereof. Preferably, the refractory material will have an average mesh size of between about −200 to −325, such mesh sizes being known in the art as "flours". The refractory material is typically present in the slurry in an amount of between about 70.0 to 90.0 wt. %.

Depending upon the intended use of the shell, the low silica content colloidal sol binder used may be positively charged, negatively charged or uncharged, e.g., neutral depending on the application. When using a positively charged silica sol, the silica particles will remain stable at virtually all pH levels as the dissolution ions of the refractory, being themselves positively charged, will not attach to the sol particles, causing their charge to neutralize and thus coalesce losing their binding ability. Examples of commercially available positively charged colloidal silicas useful in forming a sol with the addition of distilled water include Bluonic PB 9430 available from Wesbond and Wesol P also available from Wesbond. The positive silica sol will generally be present in the slurry in an amount of between 0.5 to about 20.0 wt. % and, preferably, between 2.0 and 10.0 wt. %.

An organic polymer is also generally employed. The organic polymer is preferably a soluble polymer such as polyvinyl alcohol. Highly preferred polyvinyl alcohols will have a hydrolysis level of between about 85 to 100%. A fully hydrolyzed grade of polyvinyl alcohol (PVA) is preferred because it is less susceptible to resolution on subsequent wetting of the layer during the shell build process. One example of a commercially available polyvinyl alcohol composition useful in the slurries of the present invention is Celvol 08-125 available from Celenese Corp. The organic polymer is generally present in an amount of up to about 2.0 wt. % (dry weight basis) of the slurry.

In addition to the foregoing, slurries employing a positive sol will also generally include a stabilizing acid, preferably glycolic acid or hydroxypropyl cellulose, by way of non-limiting example. The stabilizing acid is generally present in quantities of up to about 2.9 wt. % of the slurry, and preferably, between about 0.1 and 1.0 wt. %.

In addition, a cross-linking agent may be used to limit resolution of the slurry after drying. The cross-linking agent, when used, will be present in an amount of up to about 1.0 wt. %. Useful cross-linking agents may be glyoxal dialdehyde, a polyamide-epichlorohydrin resin or zirconium ammonium carbonate for example. Curesan 200 available from BASF Corporation, is a useful commercial example.

Surfactants and/or anti-foaming agents may be used in sufficient quantity to wet the wax pattern and eliminate air from the slurry. As should be appreciated by those skilled in the art, the surfactant and anti-foaming agents are generally only present on the order of 10 or fewer drops per 100 g of the slurry. Preferably, surfactants are non-ionic type surfactants and preferred anti-foaming agents are silicone based.

The liquid portion of the slurry, namely, the silica sol, the organic polymer, the stabilizing acid (if any), the cross-linking agent and water may be in the form of a pre-mixed binder composition having an overall solids content of between about 25 to 32%. Preparation of this pre-mixed liquid binder simplifies the preparation of the slurry, especially under production conditions.

A small amount of a very finely ground refractory sintering aid, such as zirconia or alumina, by way of non-limiting example, may also be employed. By "very finely ground", it is meant that the sintering aid will have an average particle size of less than about 2.0 microns. The sintering aid is generally present at between about 0.10 and 3.0 wt. %. The refractory sintering aid may be added freely to the slurry or pre-blended with the refractory material such that the dry pre-blended refractory mix can be added to the liquid binder ingredients in a single step to form the slurry. Use of these pre-blends simplifies the slurry preparation while allowing additional user control over alpha case, such as when zirconia, yttria and sintering aid are pre-blended to minimize costs while still maintaining an acceptably low level of alpha case.

Slurry formulations employing positively charged sols are set forth in Examples 1-6 presented below.

Under an alternate embodiment of the present invention, negatively charged or neutral silica sols may be employed to form stable slurries useful for making reactive metal casting shells. Such slurries have been found to remain stable in a pH range of 8 to 9 without significant aging tendencies. Examples of commercially available negatively charged colloidal silicas useful in forming a sol with the addition of distilled water including Bindzil 830 available from Eka Chemical. Further, a useful commercially available neutral silica is Bindzil DP-5110 is also available from Eka Chemical.

Slurries employing negatively charged or neutral silica sols, include, in addition to a major amount of refractory material as described above, an organic polymer. Here, however, the organic polymer may include latex, polyvinyl alcohol, hydroxypropyl cellulose and polymer emulsions based on styrene, butadiene, acrylics, and vinyls, among other polymers and co-polymers. For the negatively or neutral charged sols/slurries the organic polymer content may be higher than for the positively charged sols. In this regard, the organic polymer component may be up to about 3.0% on a dry weight basis.

To render the slurry more resistant to re-solution, one of several commercially available organic cross-linking agents may be added to the negatively charged or neutral sol based slurry to react with the polymer and binder. Along with the foregoing slurry additives, surfactants are again generally required to enhance "wetting" of wax patterns used in the process, and small amounts of an anti-foaming agent may be used, if necessary. It should be noted that while weak organic acid additions are generally used to enhance the stability of the positive sol slurries, no such acid additives are to be employed with the negatively charged or neutral systems as this could lead to binder gellation or accelerated aging.

Again, a minor amount of a very fine refractory oxide, e.g. zirconia, etc., may be added to enhance the fired strength of the coating layer and to avoid any possible surface erosion during the casting process. Other such oxides, alumina for example, could also be used. These oxides react with the refractory component, particularly yttria inclusive refractories, during the mold sintering process, which occurs prior to casting.

Slurry formations employing negatively charged or neutral sols are set forth in Examples 9-14 presented below.

After drying of the prime layer for several hours, a secondary or intermediate slurry is applied. Any suitable high temperature stable refractory slurry as found in published literature may be used. The binder system of the secondary or intermediate slurry may be either alcohol based, e.g., ethyl silicate, or water based, such as colloidal silica or other inorganic binders. If a colloidal silica intermediate system is used, additions of one of the cross linking agents described above may be used to further prevent any dissolution of the prime coat slurry. In this case, inorganic cross linking agents such as ammonium zirconium carbonate may also be used to limit softening of the prime coat(s) during the dipping process. Preferred amounts of such cross-linking or insolubilizing agents is between 0.1 to 0.5 wt. %. One or more intermediate layers may be applied as desired and would be stuccoed with suitable stable refractory grain similar to that used on the primary yttria layer.

Suitable intermediate slurry formulations useful with prime slurries described herein are set forth in Examples 15 and 16.

Several backup slurry layers are then applied. These layers consist of any suitable system common to the investment casting industry and are used to mainly build thickness of the mold and contribute to the strength necessary to withstand the rigors of dewaxing of the mold. These layers are usually stuccoed with larger sized refractory grain than the primary and intermediate coats. Refractory grains useful to stucco the above described slurry compositions may have a grit of between 20 to 70 for example. Suitable refractory stuccos include yttria, alumina, zirconia, mullite, aluminosilicate, rare earth metal oxides and mixtures thereof by way of non-limiting example.

After the mold building process is completed, a final drying cycle is typically used to ensure that the full designed strength of the mold is developed prior to removal of the wax pattern. The mold is then dewaxed using any of the commonly used methods in the industry, preferably autoclave or flash fire dewaxing. These methods are of common knowledge and have been in use throughout the industry for many years. The dewaxed mold is then inspected and repaired if necessary. Any cracks which are apparent are covered with a suitable refractory cement, and a seal dip slurry applied to the repaired area. The mold is then fired to a temperature of between about 1600 and 2200° F. and held for 2 to 4 hours to develop fired strength in the mold to withstand the stresses of casting. The firing also assists in fully developing strength in the novel prime yttria coat through sintering of the silica, sintering aid and yttria flour producing a smooth, non-dusty surface which will react only minimally with the reactive metal during and after the casting process.

Filling of the mold is done under vacuum conditions, using any of the conventionally used reactive metal casting processes. The mold, as described above, may be preheated at any temperature up to 2200° F. or lower, even at room temperature, depending on the mold and part configuration and alloy used. As would be expected, lower mold preheat temperatures will produce less metal/mold reaction and, in the case of titanium alloy casting, less alpha case, an oxygen rich brittle layer, which must be removed before the casting is put into service.

The casting, when cooled, is then removed from the mold via any conventional method and cleaned and machined as required to fulfill specifications of the end user.

The following examples are provided to further describe the present invention and are not intended to be limiting.

Example 1

Yttria Prime Coat Slurry

| Material | Weight Percent |
| --- | --- |
| Colloidal Silica (Bluonic (PB9430+) | 7.80 |
| Distilled water | 4.00 |
| Polyvinyl Alcohol (Celvol 08-125) | 12.30 |
| Glycolic Acid | 0.50 |
| Insolubilizer/cross linking agent (Curesan 200) | 0.20 |
| Zirconia (MEI Grade MS-2) | 1.80 |
| Fused Yttria (UCM −325 mesh) | 75.60 |
| Surfactant (Buntrock PS 9400) | 5 drops/100 g slurry |
| Antifoam (Buntrock AF 9450) | 2 drops/100 g slurry |

The ingredients are added and mixed in the order shown above. Preferably a high shear mixer is used to properly disperse the ingredients to achieve the desired results. After initial preparation the slurry is maintained by slow stirring until an initial stability in viscosity is observed. The user may use minor additions of distilled water and glycolic acid to adjust the viscosity to that desired. After final adjustment, the slurry was found to be stable for several weeks if kept under enclosed stirring. If maintained in an open container, periodic additions of distilled water to the slurry to account for evaporation must be made to keep at the desired viscosity.

Example 2

Yttria Prime Coat Slurry

| Material | Weight Percent |
| --- | --- |
| Colloidal Silica (Bluonic PB9430+) | 7.64 |
| Distilled water | 13.90 |
| Glycolic Acid | 0.25 |
| Zirconia (MEI Grade MS-2) | 2.08 |
| Fused Yttria (UCM −325 mesh) | 76.38 |
| Surfactant (Buntrock PS 9400) | 5 drops/100 g slurry |
| Antifoam (Buntrock AF 9450) | 2 drops/100 g slurry |

The ingredients are added and mixed in the order shown. No cross linking agent is used in this case and this slurry is recommended only for use with organic, i.e. ethyl silicate intermediate slurry.

Example 3

Yttria Prime Coat Slurry

| Material | Weight Percent |
| --- | --- |
| Colloidal Silica (Wesol P) | 7.63 |
| Distilled water | 3.91 |
| Polyvinyl alcohol (Celvol 08-125) | 12.04 |
| Glycolic Acid | 0.50 |
| Insolubilizer/cross linking agent (Bercet 2040) | 0.20 |
| Zirconia (MEI MS-2) | 1.76 |
| Fused Yttria (UCM −325 mesh) | 73.98 |
| Surfactant (PS 9400) | 5 drops/100 g slurry |
| Antifoam (AF 9450) | 2 drops/100 g slurry |

The slurry is mixed as in Examples 1 and 2. This slurry utilizes a positive silica sol (Wesbond P) and an insolubilizer, Berset 2040, a glyoxal based material to render the slurry insoluble after drying.

Example 4

Pre Mixed Binder

| Material | Weight Percent |
| --- | --- |
| Colloidal Silica (Bluonic PB9430+) | 31.3 |
| Polyvinyl alcohol (Celvol 08-125) (7.5% water solution) | 49.4 |
| Insolubilizer/cross linking agent (Curesan 200) | 1.1 |
| Glycolic Acid | 2.0 |
| Distilled Water | 16.1 |

These ingredients are mixed vigorously until homogeneous and then stored in a covered container at room temperature until use.

Example 5

Yttria Prime Coat Slurry (Made with Pre Mixed Binder)

| Material | Weight Percent |
| --- | --- |
| Pre mixed binder (From Example 4) | 22.0 |
| Zirconia (MEI MS-2) | 1.7 |
| Fused Yttria (UCM −325) | 76.7 |
| Surfactant (Buntrock PS 9400) | 5 drops/100 g slurry |
| Antifoam (Buntrock AF 9450) | 2 drops/100 g slurry |

This slurry is similar to others in previous examples, but is made using the pre mixed binder of Example 4.

Example 6

Zirconia Prime Coat Slurry (Made with Pre Mixed Binder)

| Material | Weight Percent |
| --- | --- |
| Pre mixed binder (from Example 4) | 20.0 |
| Fused Calcium Stabilized Zirconia (UCM Ca Stabilized Zirconia −325) | 80.0 |
| Surfactant (Buntrock PS 9400) | 5 drops/100 g slurry |
| Antifoam (Buntrock AF 9450) | 2 drops/100 g slurry |

This slurry is made using the pre mixed binder of Example 4, and is useful for the preparation of molds for casting smaller titanium shapes where severe heat input does not occur, resulting in acceptable alpha case. It is worthy to note that many currently used zirconia mold systems utilize objectionable ammonia based binders as their odor is undesirable.

Although the yttria prime is generally considered the least reactive and most preferred prime coat system, particularly for casting titanium alloys, other prime coat systems are also possible utilizing the same binder technology as taught in this invention. Example 6 shows a prime system utilizing a fused calcium (lime) stabilized zirconia flour. Primes utilizing zirconia are sometimes used for casting titanium, particularly when a lower cost system is desired, usually for smaller or less critical parts such as golf clubs. Current state of the art zirconia primes generally utilize either zirconium acetate or ammonium zirconium carbonate as the base binder. Zirconium acetate binders are deficient in that these coatings are generally somewhat water soluble, or sufficiently sensitive to water contact such that one needs to employ extra steps to render the coating insoluble or perhaps totally eliminate autoclave de-waxing. Autoclave de-waxing can be facilitated by the use of ammonium zirconium carbonate as the base binder, but this is objectionable for health and safety reasons because of the strong ammonia odor and inherent toxicity associated with the use of ammonium zirconium carbonate. The binder technology as taught in this invention overcomes both of these deficiencies, as there is virtually no odor or toxicity associated with the use of the positive sol (Bluonic PB-9430) such as shown in example 4. Numerous other refractory materials such as fused or tabular alumina, mullite, various alumina silicates, zircon, fused silica and various other commercially available refractories are also compatible with this binder and may be employed in prime or back-up slurries as desired depending upon alloy type being cast and/or economic considerations.

Example 7

Intermediate Cross Linking Aqueous Slurry

Contains a cross linking, insolubilizing agent which also acts as an inorganic binder to be used with the yttria slurries of this invention.

| Material | Weight Percent |
| --- | --- |
| Ammonium zirconium carbonate | 18.0 |
| Tabular alumina (−325 mesh) | 82.0 |

This slurry will not cause any softening of the yttria prime slurry as the ammonium zirconium carbonate (AZC) serves a dual purpose as an inorganic binder and as a cross linking insolublizer for any of the above Examples 1, 2 and 3.

Example 8

Intermediate Insolubilizing Aqueous Slurry

This slurry contains an organic cross-linking, insolubilizing agent to eliminate any tendencies of the yttria slurries of Examples 1, 2 and 3 to re-dissolve during the dipping process.

| Material | Weight Percent |
| --- | --- |
| Colloidal Silica Sol (Bindzil 830) | 18.0 |
| Tabular alumina (−325 mesh) | 81.8 |
| Insolubilizer/cross linking agent (Curesan 200) | 0.2 |
| Surfactant (Buntrock PS 9400) | 5 drops/100 g slurry |
| Antifoam (Buntrock AF 9450) | 2 drops/100 g slurry |

This slurry utilizes a more conventional negatively charged colloidal silica sol as the primary binder.

Example 9

Yttria Prime Coat Slurry (Negative Sol)

| Material | Weight Percent |
| --- | --- |
| Colloidal Silica (Bindzil 830) | 7.28 |
| Distilled water | 11.11 |
| Polyvinyl Alcohol (Celvol 08-125) | 3.43 |
| Curesan 200 | 0.20 |
| Zirconia (MEI Grade MS-2) | 1.38 |
| Fused Yttria (UCM −325 mesh) | 76.60 |
| Surfactant (Buntrock PS 9400) | 5 drops/100 g slurry |
| Antifoam (Buntrock AF 9450) | 2 drops/100 g slurry |

The ingredients are added and mixed in the order shown.

Example 10

Pre Mixed Binder (Negative Sol)

| Material | Weight Percent |
| --- | --- |
| Colloidal Silica (Bindzil 830) | 40.00 |
| Distilled Water | 40.00 |
| Polyvinyl Alcohol (Celvol 08-125) | 18.90 |
| Curesan 200 | 1.10 |

These ingredients are mixed vigorously until homogeneous and then stored in a covered container at room temperature until use

Example 11

Yttria Prime Coat Slurry (with Pre Mixed Binder from Example 10)

| Material | Weight Percent |
| --- | --- |
| Pre mixed binder (From Example 10) | 18.18 |
| Distilled Water | 3.83 |
| Zirconia (MEI MS-2) | 1.38 |
| Fused Yttria (UCM –325) | 76.60 |
| Surfactant (Buntrock PS 9400) | 5 drops/100 g slurry |
| Antifoam (Buntrock AF 9450 | 2 drops/100 g slurry |

This slurry is similar to others in previous examples, but is made using the pre mixed binder of Example 10.

Example 12

Zirconia Prime Coat Slurry (with Pre Mixed Binder from Example 10)

| Material | Weight Percent |
| --- | --- |
| Pre mixed binder (from Example 10) | 14.11 |
| Distilled Water | 3.53 |
| Fused Calcium Stabilized Zirconia (UCM Ca Stabilized Zirconia –325) | 82.36 |
| Surfactant (Buntrock PS 9400) | 5 drops/100 g slurry. |
| Antifoam (Buntrock AF 9450 | 2 drops/100 g slurry |

This slurry is similar to others in previous examples, but is made using the pre mixed binder of Example 10.

Example 13

Zirconia+Yttria Prime Coat Slurry (with Pre Mixed Binder from Example 10)

| Material | Weight Percent |
| --- | --- |
| Pre mixed binder (from Example 10) | 15.90 |
| Distilled Water | 3.89 |
| Fused Calcium Stabilized Zirconia (UCM Ca Stabilized Zirconia –325) | 40.11 |
| Fused Yttria (UCM –325) | 40.10 |
| Surfactant (Buntrock PS 9400) | 5 drops/100 g slurry. |
| Antifoam (Buntrock AF 9450 | 2 drops/100 g slurry |

This slurry is similar to others in previous examples, but is made using the pre mixed binder of Example 10.

Example 14

Yttria Prime Coat Slurry (Neutral Charge Sol)

| Material | Weight Percent |
| --- | --- |
| Colloidal Silica (Bindzil DP-5110) | 7.50 |
| Distilled Water | 10.89 |
| Polyvinyl Alcohol (Celvol 08-125) | 3.43 |
| Curesan 200 | 0.20 |
| Zirconia (MEI Grade MS-2) | 1.40 |
| Fused Yttria (UCM –325 mesh) | 76.58 |
| Surfactant (Buntrock PS 9400) | 5 drops/100 g slurry |
| Antifoam (Buntrock af-2004) | 2 drops/100 g slurry |

The ingredients are added and mixed in the order shown. This slurry utilizes a colloidal silica binder with a neutral charge. It should be stored in a closed container when not in use.

The slurries of the present invention after dipping, stuccoing and drying are then processed in succeeding shell layers, first with one or more intermediate coats and then any typical backup shell system. The intermediate slurry, which is recommended for use with these and similar primes, is formulated to minimize re-solution of the dried prime coats during the dipping process. The intermediate slurry contains along with a negative sol colloidal silica binder a percentage of soluble polymer for green strength and cross linking agent (as is in the prime coat as well) to further harden the prime coat and prevent dissolution of the organic polymer green bond.

Two examples of intermediate alumina based slurries are shown below.

Example 15

Intermediate Cross Linking Aqueous Slurry

Contains a cross linking, insolubilizing agent which also acts as an inorganic binder to be used with the yttria slurries of this invention.

| Material | Weight Percent |
| --- | --- |
| Ammonium zirconium carbonate | 18.0 |
| Tabular alumina (–325 mesh) | 82.0 |

This slurry will not cause any softening of the yttria prime slurry as the ammonium zirconium carbonate (AZC) serves a dual purpose as an inorganic binder and as a cross linking insolublizer for any of the above Examples 1, 2 and 3.

Example 16

Intermediate Insolubilizing Aqueous Slurry

This slurry contains an organic cross-linking, insolubilizing agent to eliminate any tendencies of the Yttria slurries of Examples 1, 2 and 3 to re-dissolve during the dipping process.

| Material | Weight Percent |
| --- | --- |
| Colloidal Silica Sol (Bindzil 830) | 16.3 |
| Distilled Water | 7.0 |
| Celvol 08-125 | 2.3 |
| Insolubilizer/crosslinking agent (Curesan 200) | 0.2 |
| Tabular alumina (−325 mesh) | 81.8 |
| Surfactant (Buntrock PS 9400) | 5 drops/100 g slurry. |
| Antifoam (Buntrock AF 9450) | 2 drops/100 g slurry. |

Example 17

Intermediate Insolubilizing Aqueous Slurry (with Premixed Binder from Example 10)

This slurry contains an organic cross-linking, insolubilizing agent to eliminate any tendencies of the Yttria slurries of Examples 1, 2 and 3 to re-dissolve during the dipping process.

| Material | Weight Percent |
| --- | --- |
| Pre mixed binder from Example 10 | 28.0 |
| Tabular alumina (−325 mesh) | 72.0 |
| Surfactant (Buntrock PS 9400) | 5 drops/100 g slurry. |
| Antifoam (Buntrock AF 9450) | 5 drops/100 g slurry. |

What is claimed is:

1. A stable slurry composition suitable for forming investment casting molds by a process involving A) applying at least one coat comprising the composition as a prime slurry onto a wax pattern; B) draining excess slurry from the pattern; and C) stuccoing the resulting part with a refractory grain, the slurry composition comprising:
   a refractory comprising one or more materials selected from yttria, zirconia, and rare earth metal oxides;
   a negatively charged or neutral colloidal silica;
   a soluble organic polymer comprising polyvinyl alcohol wherein the soluble organic polymer is present in an amount of up to about 3.0 wt. % on a dry basis;
   a cross-linking agent selected from glyoxal dialdehyde and polyamide-epichlorohydrin resin reactive with the soluble organic polymer and present at a level of 0.1-1.0% by weight of the slurry sufficient to prevent resolution upon drying; and
   water, wherein the slurry composition has a pH of at least 8.5.

2. The stable slurry of claim 1 wherein said refractory consists essentially of fused yttria, sintered yttria, fused zirconia, $Er_2O_3$, $Sc_2O_3$, $Pr_2O_3$, SrO, $La_2O_3$, or mixtures thereof.

3. The stable slurry of claim 1 wherein said negatively charged or neutral colloidal silica is present in an amount from 0.5 wt. % to 20.0 wt. % of the slurry.

4. The stable slurry of claim 1 wherein said polyvinyl alcohol is at least 85.0% hydrolyzed.

5. The stable slurry of claim 1 comprising a sintering aid in the form of a ground refractory having an average particle size of less than 2.0 microns.

6. The stable slurry of claim 5 wherein the sintering aid is present in an amount from 0.10 wt. % to 3.0 wt. %.

7. The stable slurry composition for forming investment casting molds of claim 1 comprising a negatively charged silica.

8. The stable slurry composition according to claim 7, wherein the refractory consists essentially of fused yttria, sintered yttria, fused zirconia, $Er_2O_3$, $Sc_2O_3$, $Pr_2O_3$, SrO, $La_2O_3$, or mixtures thereof.

9. The stable slurry composition according to claim 7, wherein the refractory comprises fused yttria, sintered yttria, or fused zirconia.

10. The stable slurry composition according to claim 7, wherein the refractory is fused yttria.

11. The stable slurry composition according to claim 1, wherein the crosslinking agent comprises a polyamide-epichlorohydrin resin.

12. The stable slurry composition according to claim 1, comprising a sintering aid in the form of a ground refractory having an average particle size of less than 2.0 microns.

13. The stable slurry composition according to claim 1, comprising sintering aid present in an amount from 0.1% by weight to 3.0% by weight.

14. The stable slurry composition according to claim 1, wherein the refractory comprises fused yttria.

15. The stable slurry composition according to claim 1, comprising a negatively charged silica.

16. The stable slurry composition according to claim 15, wherein the cross-linking agent is selected from glyoxal dialdehyde.

17. The stable slurry composition according to claim 1, wherein the composition has a pH of at least 9.0.

18. A method of preparing a casting shell for use in molding a metal object, comprising applying at least one coat comprising a stable slurry according to claim 1 as a prime slurry onto a wax pattern,
   draining excess slurry from the pattern, and
   stuccoing the resulting part with a refractory grain.

* * * * *